(No Model.) 3 Sheets—Sheet 1.

I. H. TAYLOR.
CAN SOLDERING MACHINE.

No. 516,980. Patented Mar. 20, 1894.

Witnesses:
J. M. Witherow
G. F. Myers

Inventor
Isaiah H. Taylor;
By Joseph A. Atkins
Attorney

THE NATIONAL LITHOGRAPHING COMPANY,
WASHINGTON, D. C.

(No Model.) 3 Sheets—Sheet 2.

I. H. TAYLOR.
CAN SOLDERING MACHINE.

No. 516,980. Patented Mar. 20, 1894.

Witnesses;
J. M. Witherow
G. T. Myers

Inventor,
Isaiah H. Taylor,
By Joseph L. Atkins
Attorney

THE NATIONAL LITHOGRAPHING COMPANY,
WASHINGTON, D. C.

(No Model.) 3 Sheets—Sheet 3.
I. H. TAYLOR.
CAN SOLDERING MACHINE.
No. 516,980. Patented Mar. 20, 1894.
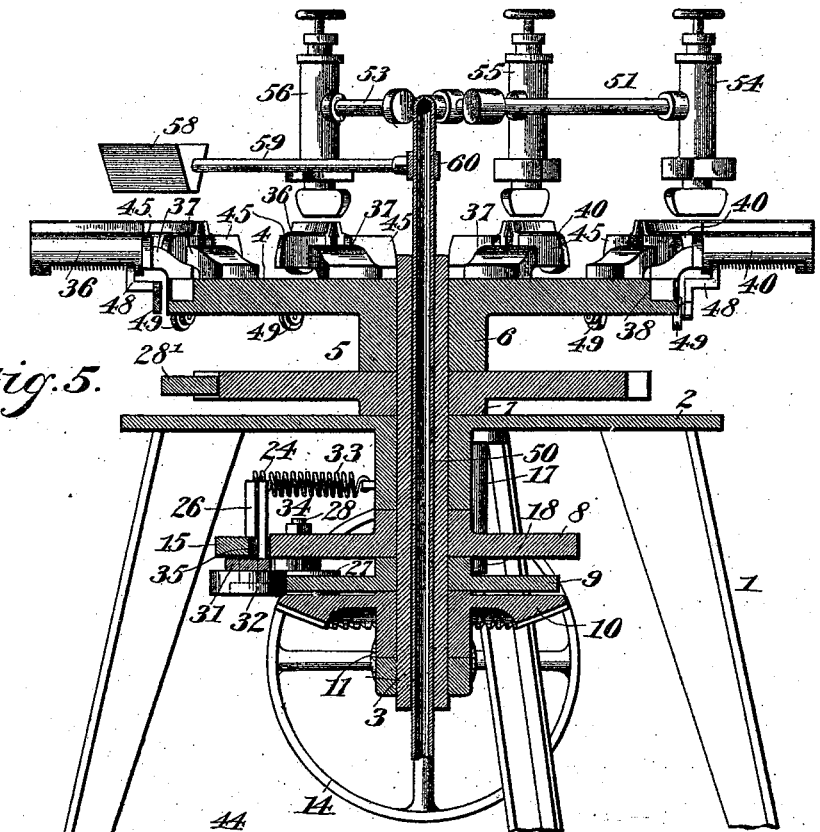
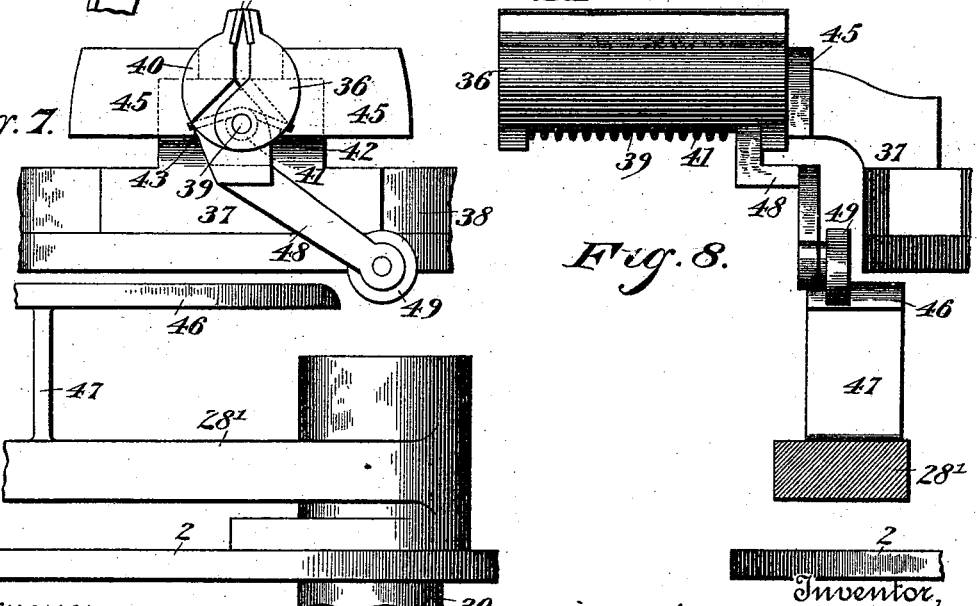
Witnesses:
J. M. Witherow
G. T. Myers
Inventor,
Isaiah H. Taylor;
By Joseph L. Atkins,
Attorney

UNITED STATES PATENT OFFICE.

ISAIAH H. TAYLOR, OF WASHINGTON, DISTRICT OF COLUMBIA, ASSIGNOR, BY DIRECT AND MESNE ASSIGNMENTS, OF THREE-FOURTHS TO SOLOMON BRESLAUER, ISADORE SAKS, AND ANDREW SAKS, OF SAME PLACE.

CAN-SOLDERING MACHINE.

SPECIFICATION forming part of Letters Patent No. 516,980, dated March 20, 1894.

Application filed July 24, 1893. Serial No. 481,349. (No model.)

*To all whom it may concern:*

Be it known that I, ISAIAH H. TAYLOR, of Washington, in the District of Columbia, have invented certain new and useful Improvements in Can-Soldering Machines, of which the following is a specification, reference being had to the accompanying drawings.

The object of my invention is to produce a machine designed for soldering the side seams of sheet metal cans, in which the operation of the machine is so timed as to permit of the convenient feeding to the machine of the blanks to be soldered, the placing of the flux and solder, the melting and perfect fluxing of the solder, and the discharge of the can body, all while the driving power is in regular movement. The machine is in effect, therefore, continuous in its operation, requiring only the attendance of an operator to keep it supplied with material for operation.

My machine is especially adapted for the manufacture of the particular form of can shown and described in my Patent No. 483,660, issued October 4, 1892, but its use is not confined to the manufacture of cans of that description.

Figure 1:
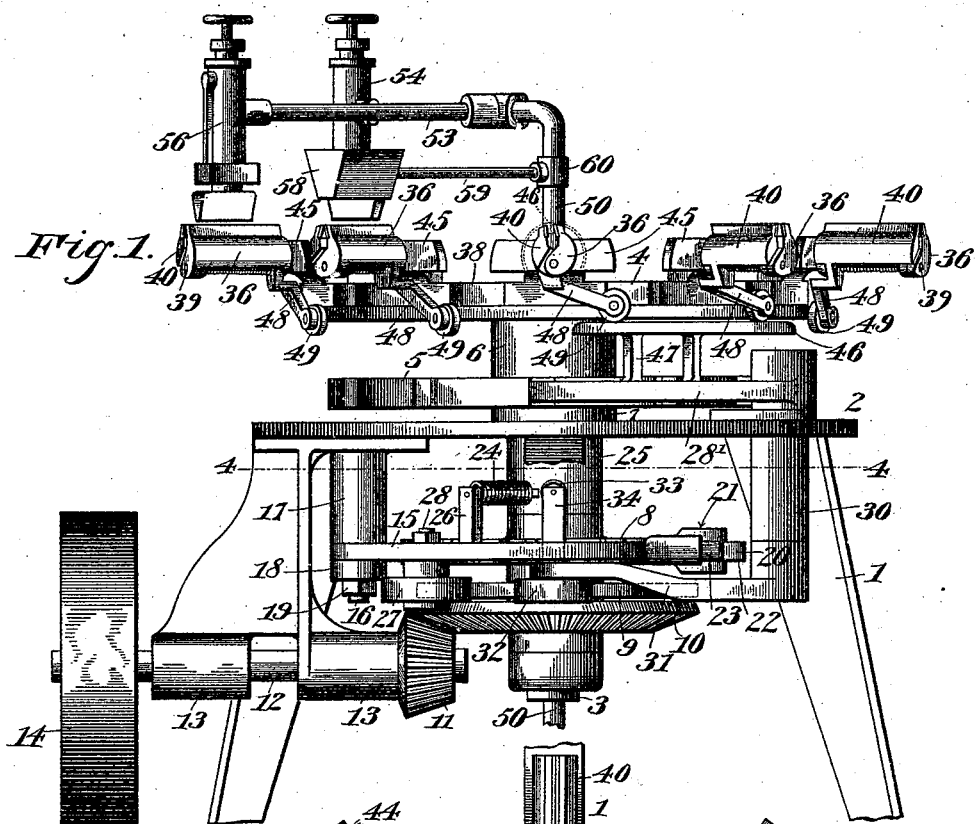
Figure 2:
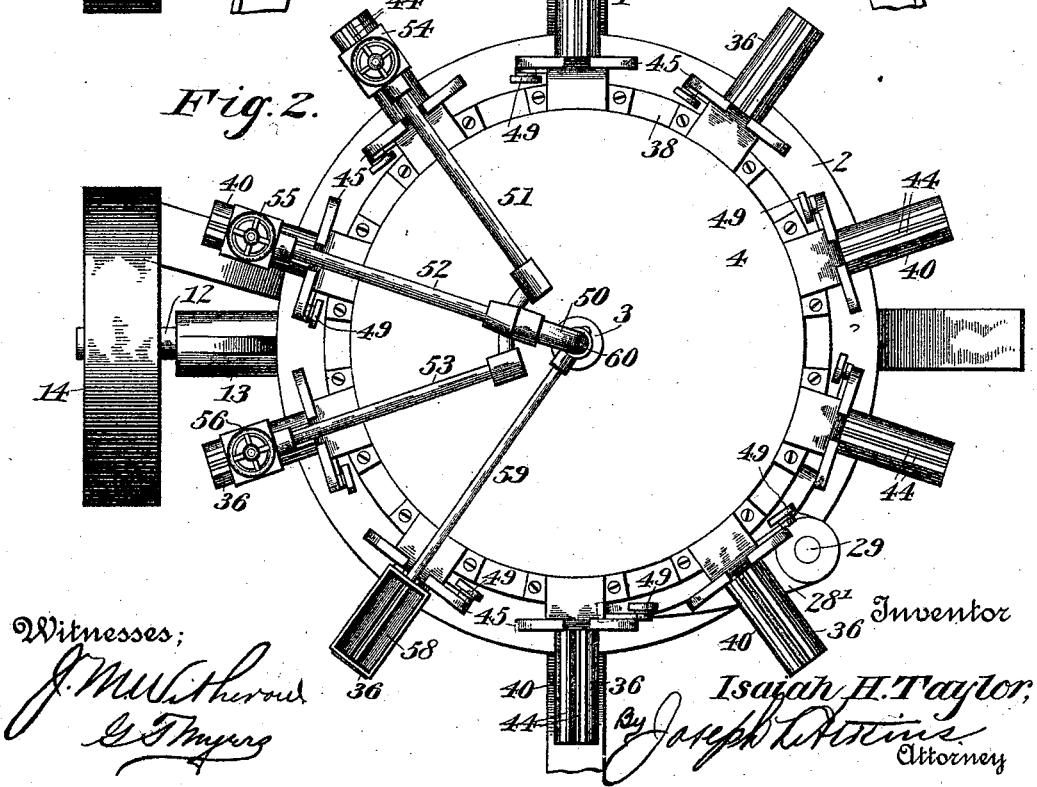
Figure 3:
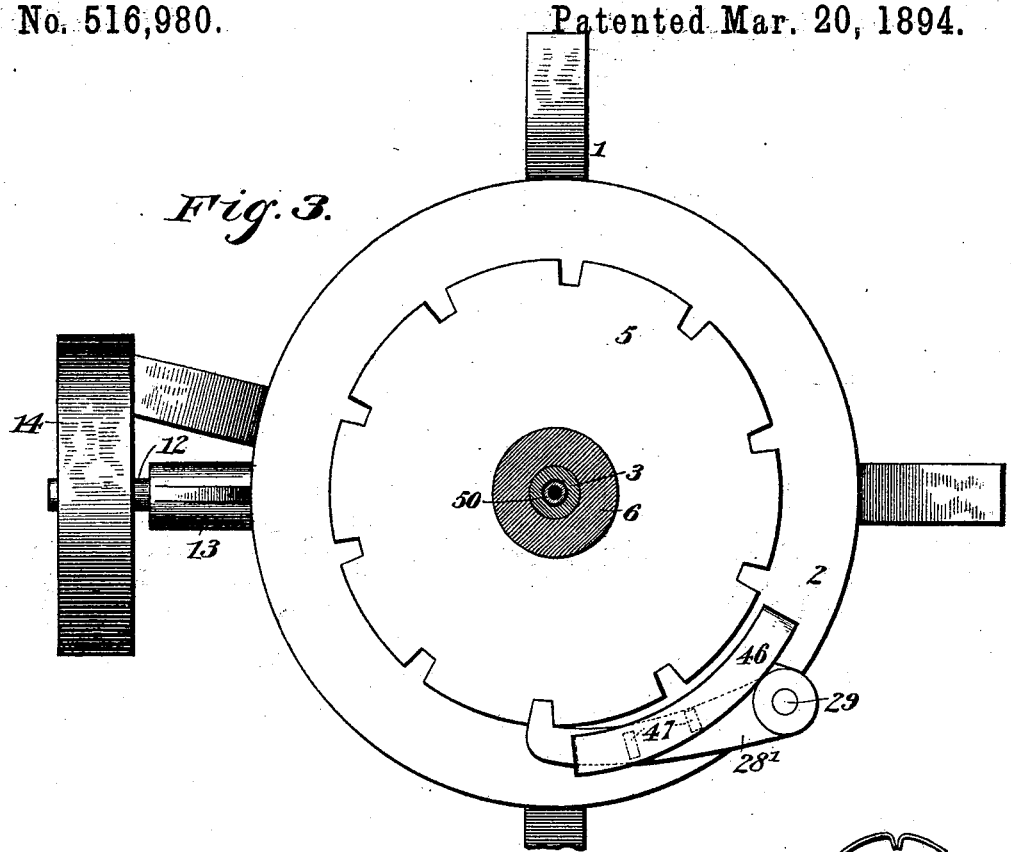
Figure 4:
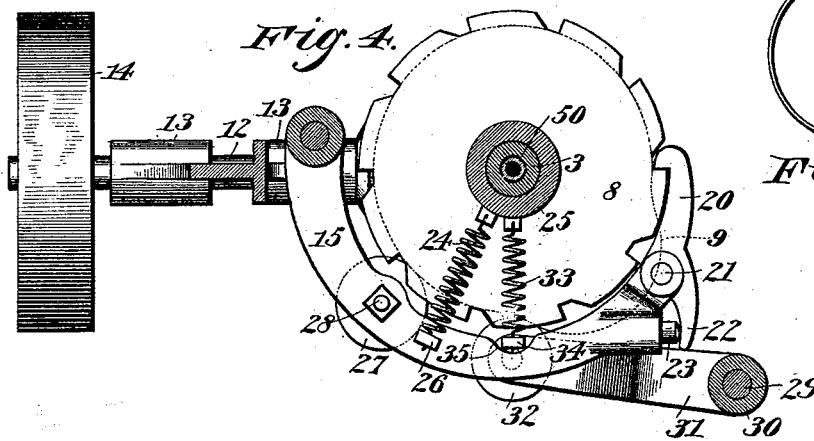
Figure 9:
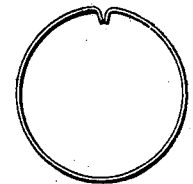
Figure 6:
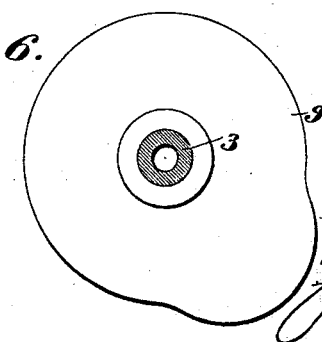

In the accompanying drawings: Figure 1 is a side elevation of my machine. Fig. 2 is a top plan view thereof. Fig. 3 is a top plan view with the revolving table removed. Fig. 4 is a sectional view, on the line 4—4 of Fig. 1. Fig. 5 is a central vertical section of the machine shown in Fig. 1. Fig. 6 is a top plan view of the cam detached. Fig. 7 is a side elevation of a section of the table, and an end view of one of the grippers. Fig. 8 is a side elevation of one of the grippers and bracket support detached. Fig. 9 is an end view of a can blank as used in connection with my machine.

Referring to the figures on the drawings: 1 indicates a suitable frame or support having a bed plate 2, or the like.

3 indicates a shaft extending through the bed plate and carrying securely upon its upper end a table 4.

5 indicates a notched disk or wheel also secured to the shaft 3 and preferably separated from the table, as by a collar 6. A collar 7 may support the notched wheel upon the bed plate.

In practice, the table, the notched wheels, and the collars 6 and 7 may, if preferred, be cast in one piece.

8 indicates a ratchet wheel secured to the shaft 3, preferably below the bed plate.

9 indicates a cam loosely supported on the shaft 3. It is designed as a prime mover to intermittently actuate the shaft 3 and the parts carried thereby. The driving mechanism consists preferably of a beveled gear 10 secured to or made integrally with the cam 9, and a beveled pinion 11 fastened to the end of a horizontal shaft 12, that is carried in suitable bearings 13 depending from the bottom of the bed plate.

14 indicates a belt pulley fixed to the shaft 12.

For communicating motion from the cam 9 to the shaft 3, I prefer to employ a curved arm 15 pivoted to the reduced end 16 of a stud 17 depending from the bottom of the bed plate. A collar 18 retained by a nut 19 may serve to pivotally support the arm upon the stud. The arm carries upon its free end a pawl 20 pivoted, as indicated at 21, to it and having a projecting end 22 against which a spring-actuated plunger 23 presses to urge the pawl against the periphery of the ratchet 8. A spring 24, secured at one end to the sleeve 25, which projects from the bottom of the bed plate and at the other end to a projection 26 on the arm 15, draws the arm toward the cam disk. Its contact therewith is prevented by an anti-friction roller 27 carried underneath the arm, as upon a stud bolt 28. The roller 27 bears against the side of the cam 9. When, in the revolution of the cam, its cam surface strikes the roller 27 it swings the arm 15 upon its pivot 16 and imparts a predetermined degree of rotation to the ratchet. When the cam surface has passed beyond the roller 27, the arm, retracted by the spring 24, advances its pawl 20 to the next notch of the ratchet and is prepared to repeat the operation as before. In practice, however, it is necessary to more exactly define the times and degrees of rotation which it is desirable for the shaft and table to make.

For that reason I employ detaining and releasing mechanism which consists, in combination with the notched disk 5, of a dog 28' secured above the bed plate to a rock shaft 29 and adapted to engage or release the notches of the disk 5. The rock shaft 29 is carried preferably in a sleeve bearing 30 projecting downwardly underneath the bed plate to which it is secured. It is necessary that the operation of the dog should precede, by a small interval, the actuation of the ratchet 8 by the arm 15. For that purpose I provide a dog releasing arm 31 secured to the end of the rock shaft 29 and extending toward the cam disk 9. It carries on its free end, in the same plane as the cam, an anti-friction roller 32. The roller 32 touches the cam so as to be actuated by it a little in advance of the operation of the cam upon the arm 15. The dog 28' will have been caused therefore to fully release the disk 5 before the cam disk begins to urge it toward rotation. The roller 32 is held in contact with the periphery of the cam by a spring 33 secured at one end to the sleeve 25 and at the other end to a stud 34 projecting from the arm 31. A recess 35 may be provided on the inner side of the curved arm 15 to give free play to the stud 34 and the arm 31 which carries it. The mechanism and the relative movements of its parts are designed to rotate the table 4 to suit the conditions and purposes for which it is employed. The table is designed to carry internal grippers for holding cans to be soldered. These preferably consist of a radially projecting jaw 36 supported by a bracket 37 bolted in an annular peripheral recess 38 in the table. A stud shaft 39 pivotally carries a second jaw 40, the latter being held normally closed against the jaw 36 by a spring 41 wrapped around the shaft 39 and having its ends bearing against the walls of the opposite jaws. Recesses 42 and 43 in the respective jaws are provided for the accommodation of the spring 41. Each of the jaws is preferably provided with a separate steel face 44 having accurately aligned edges.

The terms "internal grippers" here employed is used to distinguish the mechanism employed from any movable part which presses the edges of a can to be soldered together from the outside. The office of the jaws in my device is properly one of gripping the edges together, when, by the steel faces 44, the mechanism catches the edges of the can blank from the inside exclusively.

In practice, a previously prepared blank having inwardly crimped edges 46 is inserted between the faces 44 and is securely held as long as the spring 41 compresses the jaws together. Wings 45 project on each side of the jaws and serve as a stop for limiting the movement of the can blanks when set in place. Other guides may be provided for retaining the blanks in proper position around the jaws.

As has been explained, the grippers are held normally in the gripping position by the springs 41. For the insertion of the blanks and their removal it is necessary to provide suitable mechanism for opening certain grippers at a certain stage of the operation. For this purpose I provide suitable tripping mechanism consisting preferably of a bridge 46 supported by standards 47 upon the dog 28'. This bridge is located in line with tripping arms 48 projecting downwardly at an oblique angle from the movable jaw of the respective grippers. Each trip arm is provided on its extremity with an anti-friction roller 49. When, therefore, in the rotation of the table, the roller on the trip arm comes in contact with the bridge it is elevated by the bridge riding freely over the surface thereof. By its elevation the jaw to which the trip arm is attached is moved upon its pivot sufficiently to separate the faces 44. The jaws remain open as long as the trip arm rides upon the bridge. This interval is, in practice made sufficiently long to permit of the convenient removal of a soldered can and the replacing of a blank to be soldered. The latter is set in position just before the trip arm leaves the bridge so that as soon as it is set in place the grippers take hold of it and carry it securely. After the blank is gripped the solder, which is preferably previously prepared, in the form of wire of suitable dimensions, is laid in place, together with the flux. A sufficient interval should be allowed between the bridge and the heaters for the placing of the solder and flux. At such an interval the first heater is placed immediately over the point at which, in the intermittent rotation of the table, the can blank will remain stationary.

The object of my invention in this regard is to solder the joint by the direct application of a flame without the use of a soldering iron. I find it, therefore, necessary to use a plurality of heaters located to successively heat the solder as the can comes to a stop under the operation of the mechanism above described.

In the drawings I have illustrated a central fuel supply pipe 50 carried longitudinally through the shaft 3 which may be made hollow for its reception. This pipe communicates through the branch pipes 51, 52 and 53 with burners 54, 55 and 56, respectively, of suitable and well-known construction. These burners, as above suggested, are located respectively over the point at which the grippers come to a stop. They project, constantly toward the faces of the grippers, a hot flame. The can carried in the gripper is brought successively underneath the burners, until by the time it has left the last burner the solder is perfectly melted and fluxed and the joint is formed. It should be observed that after the gripper, carrying the can, has left the last burner a considerable interval of time elapses before its gripper reaches the bridge and the jaws are opened for its discharge. During this time the solder becomes set and the joint is perfectly formed.

For convenience of placing the solder in position upon the joint of the blank, I prefer to employ a feed box 58 carried over the grippers beyond the trip bridge by an arm 59, carried by a collar 60 around the pipe 50.

In consequence of the mechanism which I employ, it is practicable to operate the machine at a considerable saving in the solder employed. The amount necessary for each joint may be accurately determined and strips of the required dimensions may be prepared and placed upon the joints. Consequently, when the heat is applied, solder will complete the joint without waste of any sort.

I do not confine myself to the details of construction herein shown and described, but reserve the right to modify and vary the same at will within the scope of my invention.

What I claim is—

1. In a can soldering machine, the combination with a frame and intermittently actuated table, of grippers adapted to seize and hold the inturned edges of a can blank in position to be soldered, and burners adapted to melt solder previously placed upon the edges, substantially as and for the purpose specified.

2. In a can soldering machine, the combination with a frame and intermittently actuated table, of internal grippers adapted to seize and hold the inturned edges of a can blank on the table, gripper actuating mechanism, and burners located at a distance from the gripper actuating mechanism, substantially as and for the purpose specified.

3. In a can soldering machine, the combination with a frame, intermittently actuated table, internal grippers adapted to seize and hold the inturned edges of a can blank and burners, of a feed box located above the grippers so as to feed solder upon the same, substantially in the manner and for the purpose specified.

4. In a can soldering machine, the combination with a frame, movable table, and heaters, of internal grippers adapted to clamp the inturned edges of a can blank, substantially as set forth.

5. In a can soldering machine, the combination with a frame, intermittently actuated table and heaters, of internal grippers adapted to grip the inturned edges of a can blank, substantially as set forth.

6. In a can soldering machine, the combination with a frame, intermittently actuated table and heaters, of internal grippers adapted to grip the inturned edges of a can blank and gripper releasing mechanism, substantially as and for the purpose specified.

7. In a can soldering machine, the combination with a frame, intermittently actuated table and heaters, of spring-actuated internal grippers adapted to grip the inturned edges of a can blank, and gripper releasing mechanism, substantially as and for the purpose specified.

8. In a can soldering machine, the combination with a frame, of an intermittently actuated table, internal grippers thereon, adapted to seize and hold the inturned edges of a can blank and a plurality of burners located so as to successively heat a can carried in the grippers during certain successive intervals of rest, substantially as and for the purpose specified.

9. In a can soldering machine, the combination with a frame and table driving mechanism, of internal grippers on the table, adapted to seize and hold the inturned edges of a can blank and gripper releasing mechanism, substantially as set forth.

10. In a can soldering machine, the combination with a frame, table and table driving mechanism, of a notched disk connected with the table, an intermittently actuated dog connected with the driving mechanism, of grippers on the table, trip arms on the grippers, and a trip bridge on the dog, all co-operating substantially in the manner and for the purpose specified.

11. In a can soldering machine, the combination with a frame, a table, a shaft, and ratchet connected therewith, of a spring-actuated arm movable upon the table, a pawl thereon adapted to engage the ratchet, a cam, cam driving mechanism, and an anti-friction roller on the arm adapted to bear against the periphery of the cam, substantially as and for the purpose specified.

12. In a can soldering machine, the combination with a frame, table, shaft, notched disk secured to the shaft, and ratchet also secured to the shaft, of a spring-actuated arm movably secured to the frame, and a pawl thereon adapted to engage the ratchet, a cam, cam driving mechanism, and roller upon the arm adapted to ride against the periphery of the cam, a dog adapted to engage the notched disk, a rock shaft carrying the same, a dog releasing arm, and a roller upon the dog releasing arm also adapted to ride against the periphery of the same, substantially in the manner and for the purpose specified.

13. A gripper for can soldering machines, adapted to grip the inturned edges of a can blank consisting of the combination with a fixed jaw and shaft, of a movable jaw thereon, and a spring for holding the movable jaw against the fixed jaw, substantially as set forth.

14. In a gripper for can soldering machines, adapted to grip the inturned edges of a can blank the combination with a fixed jaw, of a spring-actuated movable jaw carried in operative proximity thereto, and a trip arm connected with the movable jaw and adapted, in practice, to be tripped for separating the movable jaw from the fixed jaw, substantially as set forth.

15. A gripper for can soldering machines, adapted to grip the inturned edges of a can blank consisting of the combination of separable jaws adapted to clamp a can blank from the inside, and a guide plate behind the jaws, substantially as set forth.

In testimony of all which I have hereunto subscribed my name.

ISAIAH H. TAYLOR.

Witnesses:
LOUIS G. JULIHN,
FRANK E. WARD.